US008826143B2

(12) United States Patent
Goodman et al.

(10) Patent No.: US 8,826,143 B2
(45) Date of Patent: Sep. 2, 2014

(54) CENTRAL LOGOUT FROM MULTIPLE WEBSITES

(75) Inventors: Brian D. Goodman, West Redding, CT (US); Ajay Raina, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 13/419,599

(22) Filed: Mar. 14, 2012

(65) Prior Publication Data

US 2013/0246943 A1 Sep. 19, 2013

(51) Int. Cl.
*G06F 9/44* (2006.01)

(52) U.S. Cl.
USPC ................ 715/741; 715/810; 715/760; 726/1

(58) Field of Classification Search
CPC ..... H04L 67/143; H04L 67/14; H04L 63/102; H04L 63/101; H04L 67/34; G06F 17/30899; G06F 21/31; G06F 21/41; G06F 9/44505
USPC .............................................. 726/1; 715/760
See application file for complete search history.

(56) References Cited

U.S. PATENT DOCUMENTS

| | | | |
|---|---|---|---|
| 6,516,421 B1* | 2/2003 | Peters | 713/502 |
| 7,219,154 B2 | 5/2007 | Blakley, III et al. | |
| 7,475,353 B2 | 1/2009 | Nuzzi | |
| 7,540,020 B1 | 5/2009 | Biswas et al. | |
| 7,673,045 B1 | 3/2010 | Battle et al. | |
| 2004/0019687 A1* | 1/2004 | Ozawa et al. | 709/229 |
| 2006/0218629 A1 | 9/2006 | Pearson et al. | |
| 2007/0022381 A1 | 1/2007 | Nuzzi | |
| 2009/0037741 A1* | 2/2009 | Kirkland et al. | 713/182 |
| 2009/0100438 A1* | 4/2009 | Hinton et al. | 719/311 |
| 2010/0154046 A1 | 6/2010 | Liu et al. | |
| 2011/0083138 A1* | 4/2011 | Sivasubramanian et al. | 719/328 |
| 2011/0307941 A1* | 12/2011 | Dhanakshirur et al. | 726/4 |
| 2012/0210413 A1* | 8/2012 | Akula et al. | 726/8 |
| 2013/0080351 A1* | 3/2013 | Schneider et al. | 705/36 R |

OTHER PUBLICATIONS

IBM, "A Method and Process for Browser Notification Web Site Availability," http://www.ip.com/pubview/IPCOM000189051D, Oct. 26, 2009.
IBM TDB, "The Method of Dynamic Site Navigation Based on Access Log of Web Server," http://www.ip.com/pubview/IPCOM0001632D, Nov. 1, 2002.
Citrix Systems Inc., "Web Interface Administrator's Guide," Citrix Web Interface 4.5, CitrixSystems.com, 2006.
International app. No: PCT/US13/24804, Notification of Transmittal of the International Search Report and the Written Opinion, of the International Searching Authority, or the Declaration, dated May 28, 2013.
"How to: Hack Any FB Account Using Cookie Stealing", http://geeksincorporated.wordpress.com/2012/05/02/how-to-hack-any-fb-account-using-cookie-stealing, printed on Dec. 9, 2013.
Hack Facebook by Cookie Stealing, https://www.facebook.com/hacking.goteasy/posts/296157083743273, printed on Dec. 9, 2013.

* cited by examiner

*Primary Examiner* — Amy Ng
*Assistant Examiner* — Sang H Kim
(74) *Attorney, Agent, or Firm* — Cahn & Samuels, LLP

(57) ABSTRACT

A method for enabling logout from websites includes creating at least one meta-data tag for a web page, where said at least one meta-data tag comprises a logout universal resource locator for the web page; reading the at least one meta-data tag for each web application that a user is logged into; recording the logout universal resource locator in a database; and displaying a name of each web application and the corresponding logout universal resource locator in a graphical user interface.

20 Claims, 6 Drawing Sheets

| Web App | Login time | Logout URL | Preferences |
|---|---|---|---|
| IBM | May 5, 2011 10:30 AM ET | https://www-947.ibm.com/pim/logout.form | Edit Preferences |
| Google | May 5, 2011 11:30 AM ET | http://www.google.com/accounts/Logout | Edit Preferences |
| Facebook | May 5, 2011 10:30 AM ET | http://www.facebook.com/logout.php | Edit Preferences |

Management UI showing details of different Web sites the user is logged into — 315

Edit preferences for logging out (e.g. after 15 minutes of in activity) — 320

CENTRAL LOGOUT FROM MULTIPLE WEBSITES

BACKGROUND

The present invention relates to a system and methods for enabling a logout from at least one website, and more particularly for enabling a user centric logout from multiple websites.

While browsing the web, it is common for a user to log into multiple websites and stay logged in for some time. Typically, each website provides a specific logout function. Some websites use a single sign on capability, allowing a user to be to be logged in/out across participating websites. In order to ensure a secure log out, the burden is on users to explicitly logout from the websites they have logged into. Simply relying on websites to invalidate login tokens based on service provider policies makes a user vulnerable to hacking, for example, with tools like WireShark.

There remains a need for a system and methods to definitively end and invalidate a session with at least one website, for example multiple websites, without requiring an explicit logout action. This would be helpful to web users, as many web applications and services are making it increasingly difficult to sign out or log out of their websites, thereby raising significant privacy and security issues.

BRIEF SUMMARY

According to one or more embodiments of the present invention, a method for enabling logout from websites is provided. At least one meta-data tag for a web page is created, wherein the at least one meta-data tag comprises a logout universal resource locator for the web page. The at least one meta-data tag for each web application that a user is logged into is read. The logout universal resource locator is recorded in a database. A name of each web application and the corresponding logout universal resource locator is displayed in a graphical user interface.

According to another embodiment of the present invention, a method for enabling logout from a website includes reading at least one meta-data tag for a webpage that a user is logged into, where the at least one meta-data tag comprises a logout universal resource locator for the webpage; displaying a name of the web application and the corresponding logout universal resource locator in a graphical user interface; and creating a rule for automatically logging out of the web application.

According to one or more embodiments of the present invention, a system for enabling user centric logout from multiple websites is provided comprising an electronic database for storing at least one logout universal resource locator of at least one website from at least one meta-data tag; a graphical user interface in communication with the electronic database, the graphical user interface displaying a name of the at least one website and the at least one logout universal resource locator; and a controller for automatically logging a user out of at least one website.

According to one or more embodiments of the present invention, a computer program product for enabling user centric logout from multiple websites is provided comprising a computer readable storage medium. First program instructions create at least one meta-data tag for a web page, where the at least one meta-data tag comprises a logout universal resource locator for the web page. Second program instructions read the at least one meta-data tag for each web application that a user is logged into. Third program instructions record the logout universal resource locator in a database. Fourth program instructions display a name of each web application and the corresponding logout universal resource locator in a graphical user interface. The first, second, third, and fourth program instructions are stored on the computer readable storage medium.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the system and methods should become evident to a person of ordinary skill in the art.

BRIEF DESCRIPTION OF SEVERAL VIEWS OF THE DRAWINGS

FIG. 3 is an illustration of a management user interface according to an embodiment of the present invention.

DETAILED DESCRIPTION

The discussion below is directed to a web-based environment, but the present invention may also be implemented in non-web applications (e.g., Desktop, Rich Client applications).

According to one or more embodiments of the present invention, users may have a view into all websites they are currently logged into. Users may set at least one policy or rule for securely and automatically logging out of at least one website or web application and therefore do not have to worry about explicitly logging out of each website or application. Users do not have to rely on the default mechanism of login tokens expiring based on the service provider policies.

Figure 1:
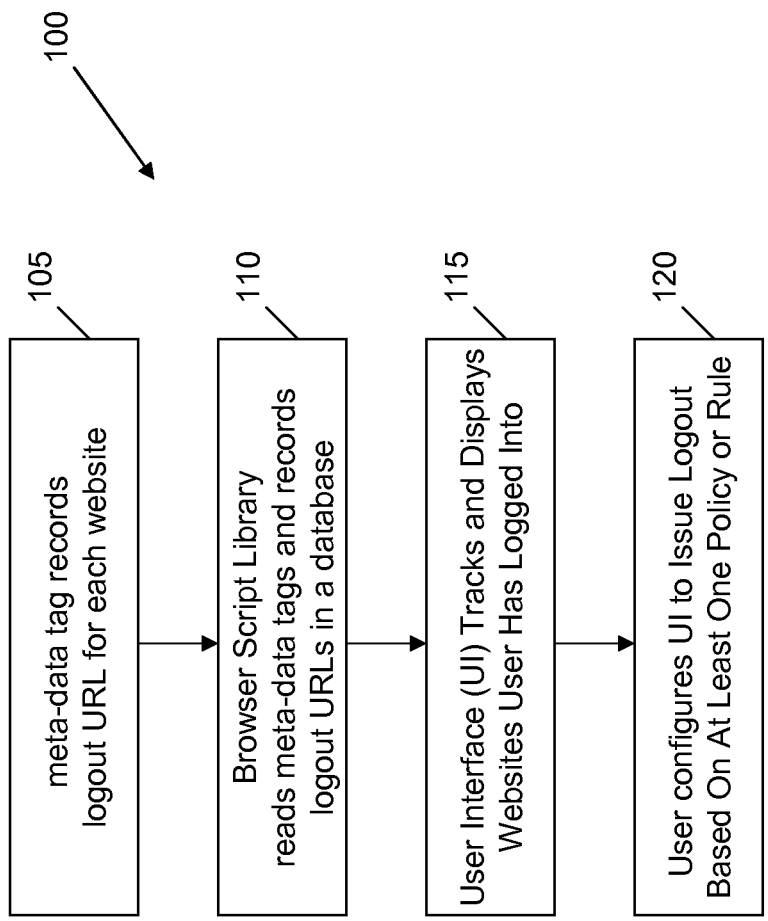
FIG. 1 is a schematic flowchart of a method according to an embodiment of the present invention.

With reference now to FIG. 1, a method 100 according to one or more embodiments of the present invention is illustrated. A web page markup (HTML) meta-data tag is used to record or capture a logout universal resource locator (URL) for a website, 105. As a user navigates through multiple web applications, a meta-data tag for each website or web application may record or capture the corresponding logout URL for that website. In specific embodiments, the meta-data tag may capture additional information, for example, at least one of country, language, time of access, duration of access, or coding for a website. According to the present invention, meta-data tags may record or capture logout URLs across different web domains.

In one or more embodiments of the present invention, internet service providers of websites may add at least one meta-data tag on their website or webpage to capture the corresponding logout URL. Thus, from a service provider's perspective, the system and methods of the present invention offer an opportunity to free up resources, without having to wait for a default policy of expiring login tokens to kick in. In specific embodiments, web pages can easily add the at least one meta-data tag as part of a standard template for building web applications. For example, a meta-data tag may be added to a website, such as:

```
<meta name="lurl" content="//www.yoursite.com/app1/logout"/>
(required)
<meta name="Description" content="My App1"/>
```

A browser script library is implemented that reads or inspects the at least one meta-data tag and records the logout URL for each website, and any additional information, in a database, 110. According to the present invention, the browser script library may be an add-on or plug-in for the browser. The script library reads each meta-data tag and records the corresponding information in a separate local database or in local storage within the browser.

A graphical user interface (management UI) tracks and displays the websites a user has logged into, 115. A user can explicitly choose to logout of one or more websites or may configure the management UI to issue logouts based on at least one policy or rule, 120. In one or more embodiments, additional meta-tag information from at least one website or web application may be displayed in the management UI.

Figure 2:
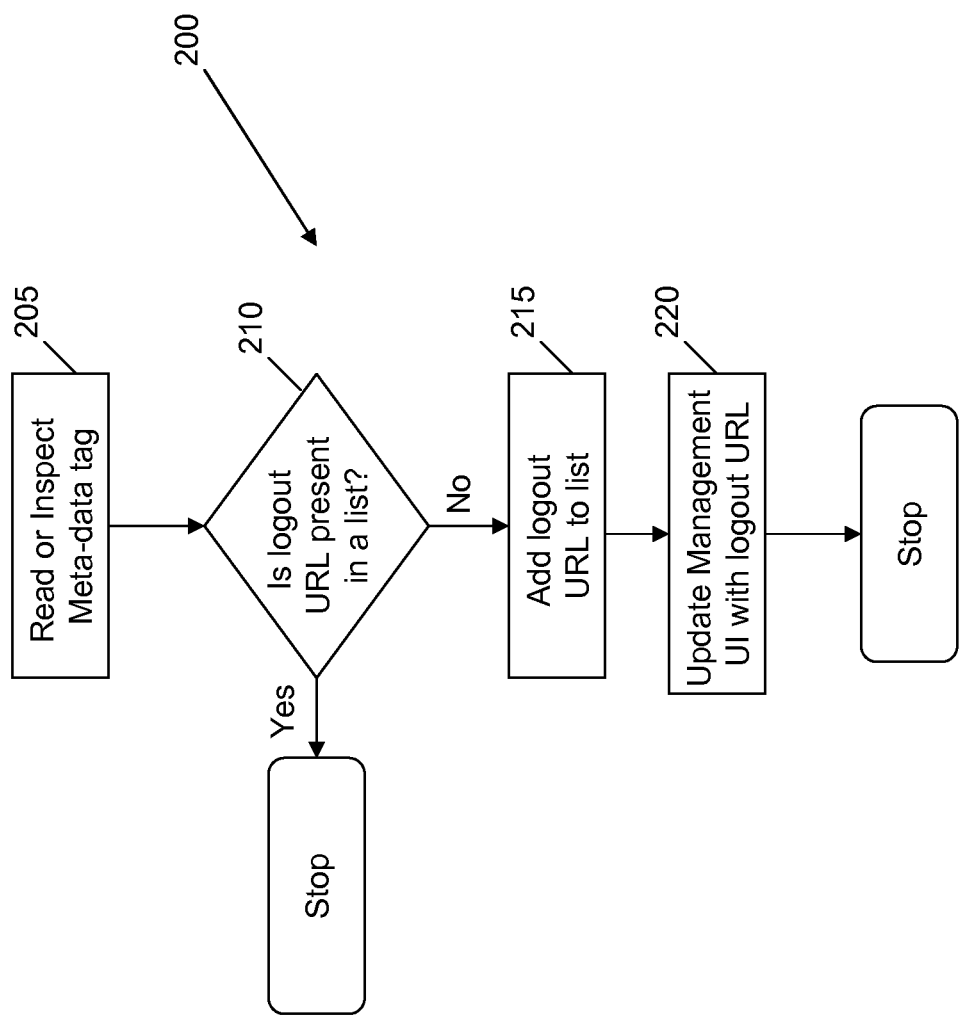
FIG. 2 is a schematic flowchart of a script library operation according to an embodiment of the present invention.

With reference now to FIG. 2, a flowchart 200 for a script library operation according to one or more embodiments of the present invention is provided. In a specific embodiment, the script library may be built, for example, using JavaScript®. At least one meta-data tag is read or inspected, 205. It is determined if the logout URL is present in a list, 210, for example, a list stored in a local database or local storage. If the logout URL is not present in the list, the logout URL is added to the list, 215. The management UI is updated with the logout URL, 220. In a specific embodiment, the script library may implement the following logic:
Initialize URL List

```
If "lurl" meta-tag present{
    if "content" value Not in URL List{
        add "lurl" to list
    }
}
``` update URL list in local storage
update Management UI (#3)

With reference now to FIG. 3, a management user interface (UI) 300 according to one or more embodiments of the present invention is depicted. The management UI displays a list of web applications (e.g., IBM®, Google®, Facebook®, Yahoo®) and/or web services (e.g., Gmail®) 305 for which a user is currently logged into as well as a corresponding logout URL 310 obtained from the script library from having read the at least one meta-data tag for each website.

In one or more embodiments, management UI 300 may also include additional information obtained from at least one meta-data tag, such as Login time 315, which shows the time a user logged into each displayed web application. In one or more embodiments, the management UI may also include the duration of a user's log-in to at least one web application or service, for example, in minutes, hours, or days.

The management UI 300 also includes Preferences 320. The Preferences 320 allows a user to create and edit at least one policy or rule for automatically logging out of at least one website, for example, for each displayed website 305. The Preferences 320 may allow creation and/or editing of the at least one policy or rule directly within the management UI or via a separate pop-up window or additional graphical user interface.

The management UI 300 automatically applies the at least one policy or rule in case a user does not proactively and explicitly logout of at least one website or webpage. In a specific embodiment, the at least one policy or rule may comprise at least one of logging out of a specific website, web application, or service after a set duration, after a browser is closed, or after a browser window or tab is closed.

According to one or more embodiments, the management UI 300 may include a radio button or toggle allowing a user the option of enabling or disabling an automatic logout from one or more of web applications or services, 325.

According to one or more embodiments, the management UI may store user actions (e.g., user history) over a set period of time and may make at least one recommendation to a user based upon web usage. For example, the management UI may recommend that a user change the enable/disable feature for a specific website or may recommend changing user preferences to a default policy, for example, logging out of one or more websites when a browser is closed.

Figure 4:
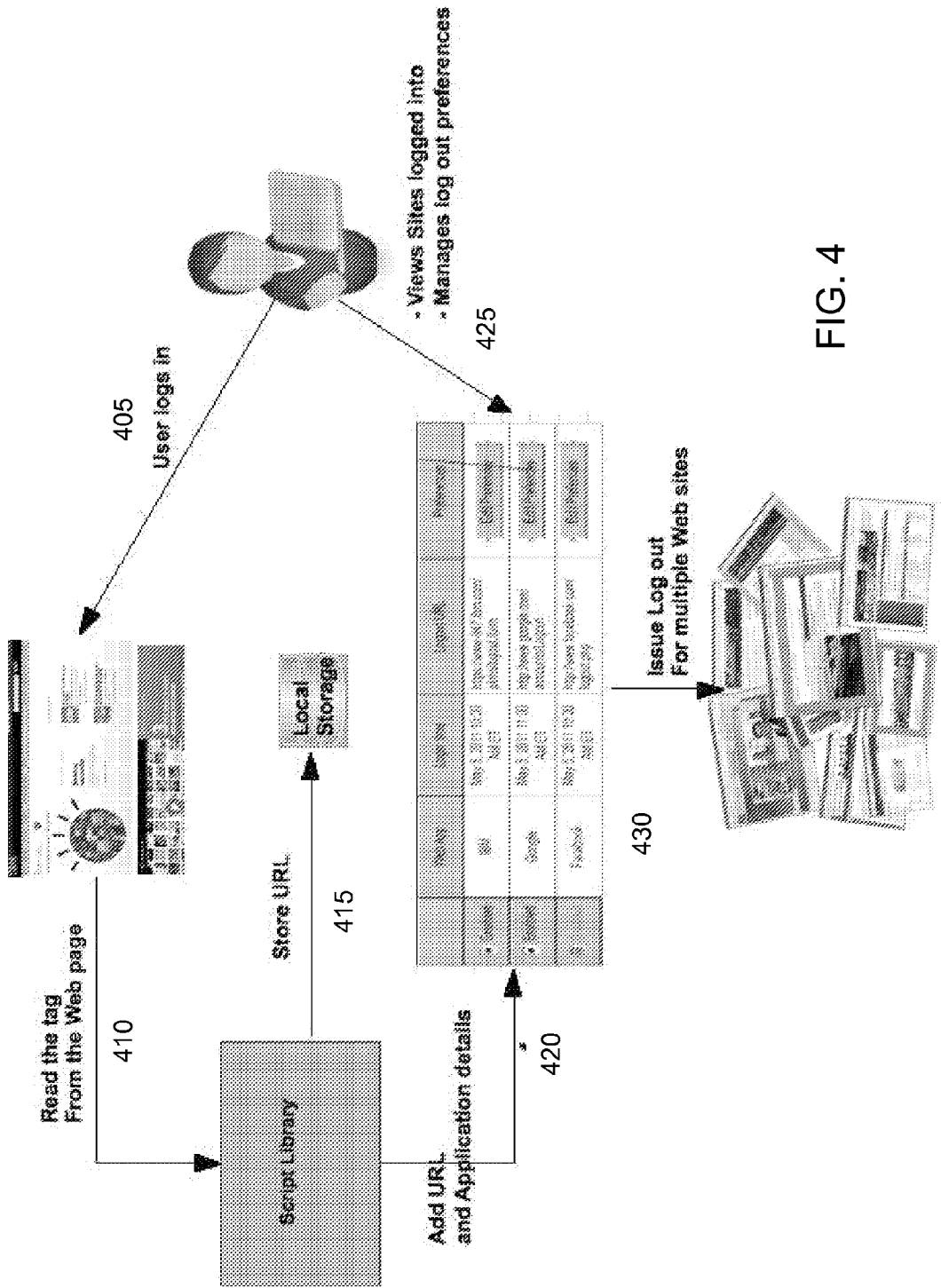
FIG. 4 is a schematic diagram of modules and interactions according to an embodiment of the present invention.

With reference now to FIG. 4, a schematic diagram illustrates modules and interactions therebetween according to an embodiment of the present invention.

A user logs into one or more web applications 405, each web application having at least one meta-data tag. A script library reads or inspects the meta-data tag, 410, and records the logout URL and any additional information in a database 415 (e.g., local storage). The logout URL and any additional application information are displayed in a management UI, 420. The user views websites that he or she has logged into in the management UI and creates, edits, and manages user preferences, 425. The management UI automatically issues logouts for multiple websites, 430 according to the user preferences, without requiring explicit user action.

Figure 5:
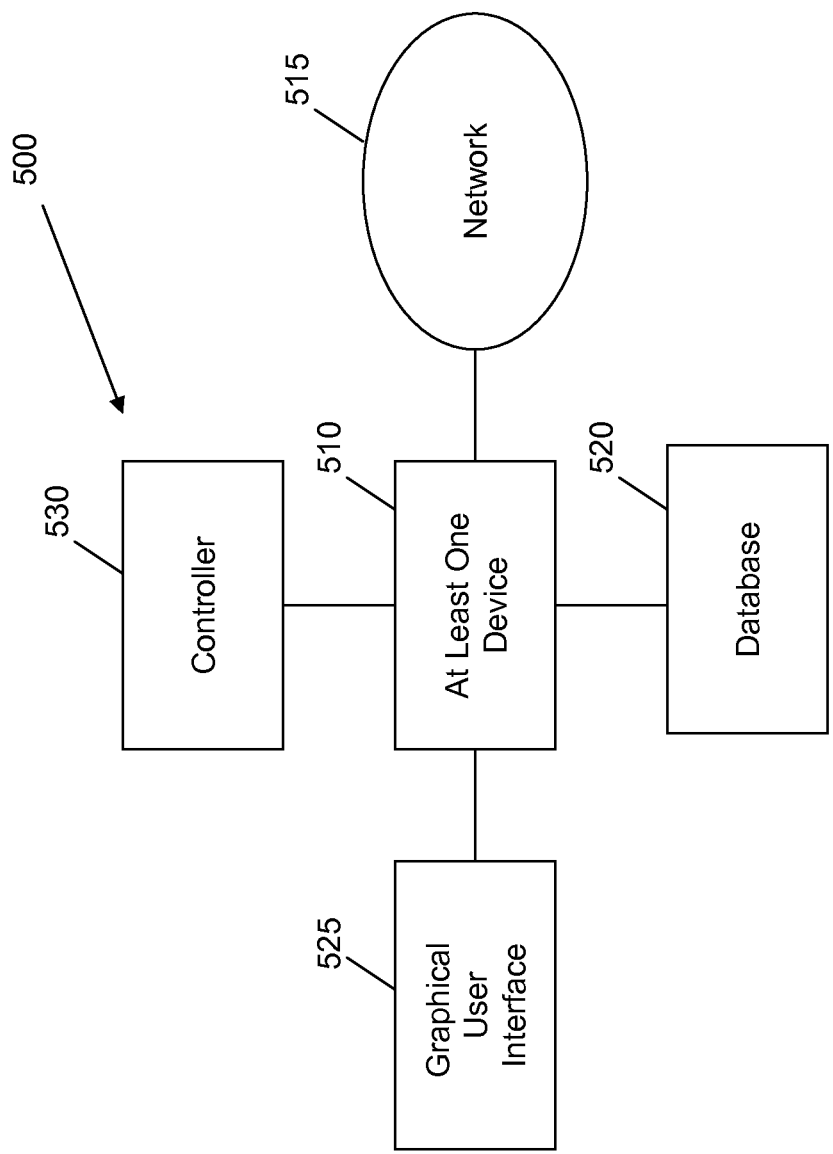
FIG. 5 is a schematic block diagram of a system according to an embodiment of the present invention.

With reference now to FIG. 5, a schematic diagram illustrates a system 500 according to an embodiment of the present invention. The system includes at least one electronic or digital device 510 (e.g., a personal computer, cellular telephone, personal digital assistant or PDA, game device, MP3 player, television). The at least one device may be connected to a network 515 (e.g., the internet, World Wide Web, intranet, local area network (LAN), wide area network (WAN)). The system also includes an electronic database 520 for storing logout URLs and any additional information read from at least one meta-data tag and a graphical user interface 525 in communication with the electronic database 520 for displaying the management UI. As used herein, "in communication" includes physical and wireless connections that are indirect through one or more additional components (or over a network) or directly between the two components described as being in communication. The at least one device 510 may comprise, or be in communication with, a controller 530 for automatically logging a user out of at least one website according to user preferences. The controller 530 may comprise one or more processors having embedded application logic or program code.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
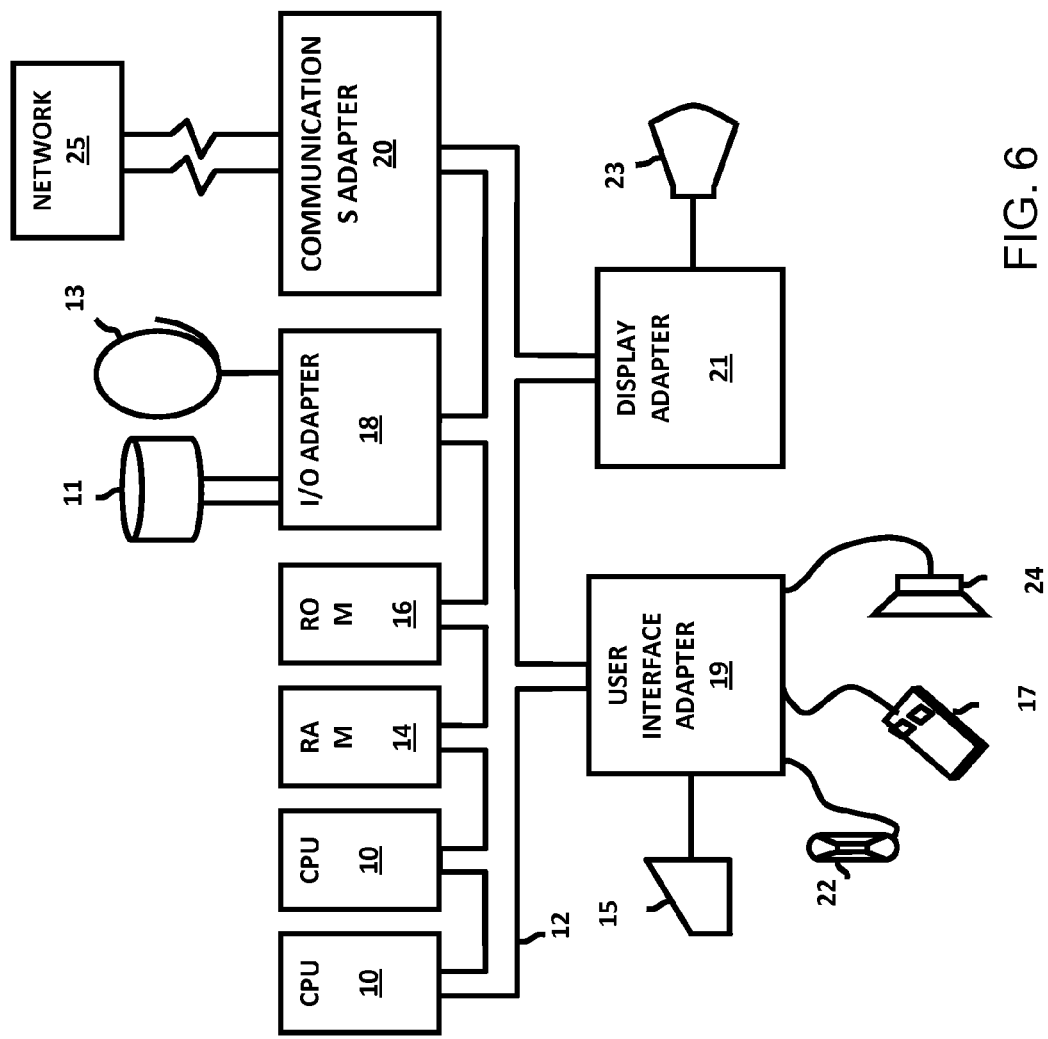
FIG. 6 is a schematic diagram of another system according to an embodiment of the present invention.

Referring now to FIG. 6, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for enabling logout from websites, comprising:
    creating at least one meta-data tag for a web page, where said at least one meta-data tag comprises a logout universal resource locator for the web page;
    reading the at least one meta-data tag for each web application that a user is logged into, wherein the at least one meta-data tag further comprises data for country, language, time of access, and duration of access for at least one web application;
    recording the logout universal resource locator in a database;
    displaying a name of each web application, the at least one meta-data tag, a duration of the user's log-in to at least one website, a toggle for enabling and disabling an automatic logout from at least one web application or service, and the corresponding logout universal resource locator in a graphical user interface; and
    displaying user preferences in the graphical user interface, wherein said user preferences allow creating and editing of at least one rule for automatically logging out of at least one web application.

2. The method according to claim 1, wherein the at least one rule comprises automatically logging a user out of at least on website after at least one of after a set duration of the user's log-in, after a browser is closed, or after a new browser window or tab is closed.

3. The method according to claim 1, further comprising configuring the graphical user interface to automatically issue at least one logout for at least one web application based on the at least one rule.

4. The method according to claim 3, wherein the at least one rule logs a user out of a plurality of web applications.

5. The method according to claim 1, further comprising automatically logging out of multiple web applications.

6. The method according to claim 1, wherein a browser script library reads the at least one meta-data tag.

7. The method according to claim 6, wherein the browser script library comprises an add-on or plug-in for a web browser.

8. The method according to claim 1, wherein the database comprises local storage within a web browser.

9. The method according to claim 1, further comprising storing a user history over a set period of time and making at least one recommendation to a user based upon web usage.

10. The method according to claim 1, further comprising recommending that a user change an enable/disable feature for a specific website.

11. The method according to claim 1, further comprising recommending changing user preferences to a default policy.

12. The method according to claim 1, wherein the at least one rule comprises automatically logging a user out of at least on website after a browser is closed.

13. The method according to claim 1, wherein the at least one rule comprises automatically logging a user out of at least on website after a new browser window or tab is closed.

14. The method according to claim 1, wherein the duration of a user's log-in to at least one website is displayed in hours or days.

15. The method of claim 1, comprising displaying all web applications a user is currently logged into, said user setting at least one rule for automatically logging out of each web application.

16. The method of claim 1, further comprising recommending the user to enable or disable the at least one rule for a specific website.

17. The method for enabling logout from a website, comprising:
    reading at least one meta-data tag for a webpage that a user is logged into, where said at least one meta-data tag comprises data for country, language, time of access, duration of access for at least one web application, and a logout universal resource locator for the webpage;
    recording the logout universal resource locator in a database;
    displaying a name of the web application, the at least one meta-data tag, a duration of the user's log-in to at least one website, a toggle for enabling and disabling an automatic logout from at least one web application or service, and the corresponding logout universal resource locator in a graphical user interface;
    displaying user preferences in the graphical user interface, wherein said user preferences allow creating and editing of at least one rule for automatically logging out of at least one web application; and
    creating at least one rule for automatically logging out of the web application.

18. The method according to claim 17, comprising automatically logging out of multiple web applications.

19. A system for enabling user centric logout from multiple websites, comprising:
    at least one electronic or digital device connected to a network and in communication with a controller for automatically logging a user out of at least one website;
    an electronic database for storing at least one logout universal resource locator of at least one website from at least one meta-data tag, wherein the at least one meta-data tag further comprises data for country, language, time of access, and duration of access for at least one web application; and
    a graphical user interface in communication with the electronic database, said graphical user interface displaying user preferences allowing for creating and editing of at least one policy or rule for automatically logging out of the at least one website; a duration of the user's log-in to at least one website; a toggle for enabling and disabling an automatic logout from at least one web application or service; a name of the at least one website; and the at least one logout universal resource locator.

20. The system according to claim 19, wherein the controller comprises one or more processors with embedded computer code or application logic.

* * * * *